United States Patent
Wang et al.

(10) Patent No.: US 7,215,494 B2
(45) Date of Patent: May 8, 2007

(54) SYSTEM AND METHOD FOR PERFORMING ADAPTIVE READ RETRY OPERATIONS IN A DATA STORAGE DEVICE

(75) Inventors: Jun Wang, Singapore (SG); Challa Anantha Lakshmi, Singapore (SG); Xueyi Miao, Singapore (SG); Kan Liang Gan, Singapore (SG); Myint Ngwe, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 442 days.

(21) Appl. No.: 10/263,322

(22) Filed: Oct. 1, 2002

(65) Prior Publication Data

US 2003/0202268 A1 Oct. 30, 2003

Related U.S. Application Data

(60) Provisional application No. 60/375,857, filed on Apr. 26, 2002.

(51) Int. Cl.
*G11B 27/36* (2006.01)

(52) U.S. Cl. .................... 360/31; 360/53; 360/77.02

(58) Field of Classification Search .................... 360/31, 360/53, 46, 77.02, 78.04; 324/210, 212, 226; 714/704, 774, 770, 769
See application file for complete search history.

(56) References Cited

U.S. PATENT DOCUMENTS

| 6,055,118 | A | 4/2000 | Du |
| 6,122,125 | A | 9/2000 | Clare et al. |
| 6,195,028 | B1 | 2/2001 | Fredrickson et al. |
| 6,252,731 | B1 | 6/2001 | Sloan et al. |
| 6,268,974 | B1 | 7/2001 | Sloan et al. |
| 6,275,346 | B1 * | 8/2001 | Kim et al. ..................... 360/31 |
| 6,650,491 | B2 * | 11/2003 | Suzuki et al. ................. 360/31 |
| 6,754,030 | B2 * | 6/2004 | Seng et al. .................... 360/76 |
| 6,839,193 | B2 * | 1/2005 | Chong et al. ................. 360/31 |
| 6,952,321 | B1 * | 10/2005 | Lim et al. ................. 360/77.04 |
| 2001/0028522 | A1 * | 10/2001 | Suzuki et al. ................. 360/53 |
| 2003/0002197 | A1 * | 1/2003 | Seng et al. .................... 360/76 |

* cited by examiner

*Primary Examiner*—Alan T. Faber
(74) *Attorney, Agent, or Firm*—Shumaker & Sieffert, P.A.

(57) ABSTRACT

A system and method for performing read retry operations with respect to an erroneously read data sector is disclosed. The system and method use estimates of bit error rates determined during previous attempts to read data from the sector to determine an optimal distance and direction to move a read transducer for a subsequent read retry of the erroneously data sector.

31 Claims, 7 Drawing Sheets

SYSTEM AND METHOD FOR PERFORMING ADAPTIVE READ RETRY OPERATIONS IN A DATA STORAGE DEVICE

RELATED APPLICATIONS

This application claims priority of U.S. provisional application Ser. No. 60/375,857, filed Apr. 26, 2002.

FIELD OF THE INVENTION

This application relates generally to performing read retry operations in a data storage device and more particularly to adaptively selecting optimal positions for performing read retry operations in a data storage.

BACKGROUND OF THE INVENTION

Modern disc drives typically comprise one or more discs that are coated with a magnetizable medium and mounted on a hub of a spindle motor for rotation at a constant high speed. Information is written to and read from nominally circular, concentric data tracks on the discs through the use of a read/write head mounted to a movable actuator assembly positioned adjacent the discs. The actuator assembly typically includes a plurality of actuator arms that extend over the discs, with one or more flexures extending from each of the actuator arms. Mounted at the distal end of each of the flexures is the read/write head, including a write transducer for writing information to the tracks and a read transducer for reading information from the tracks when the read write head is positioned over the desired track.

To move the heads over the desired track, the actuator assembly typically includes a voice coil motor (VCM), which includes a coil attached to the actuator assembly, as well as one or more permanent magnets that establish a magnetic field in which the coil is immersed. The controlled application of current to the coil causes magnetic interaction between the permanent magnets and, as a result, the coil moves in accordance with the well known Lorentz relationship. As the coil moves, the actuator assembly pivots about a bearing shaft assembly, and the heads are caused to move across the surfaces of the discs.

Each of the concentric data tracks on a disc typically includes a number of data sectors for recording used data. In addition, special servo information is typically included in each track to assist in determine the position of the read/write head. The servo information is typically written in a plurality of servo sectors that are angularly spaced from one another and interspersed between data sectors around each track of each disk. Each servo sector typically includes a track identification (ID) field and a group of servo bursts. To position a read or write transducer over a desired track, a servo control system uses the track ID field as a control input and calculates and applies an appropriate current to the coil of the voice coil motor to move the transducer toward the desired track during a coarse "seek" mode. Once the transducer is generally over the desired track, the servo control system uses the servo bursts to keep the transducer over that track in a fine "track follow" mode. The read transducer generally reads the servo bursts to produce a position error signal (PES) that is indicative of the position of the read element, relative to a predetermined radial position on the track.

To ensure reliable storage and retrieval operations by the disc drive, the user data is typically encoded with an error correction codes (ECC) before being written to the disc. The ECC is used to detect and correct up to a selected number of errors in the retrieved sequence of data. Occasionally a disc drive will read erroneous data from a data sector that cannot be corrected by the ECC. These type of uncorrectable errors (read errors) are typically detected by an error correction code circuit (ECC) in the disc drive, which may perform both error detection and error correction upon the data read from the data sectors (using, for example Reed-Solomon codes). If no uncorrectable errors are present, the read data is output to the user. However, if the ECC circuit is not able to correct the error(s), a read error is declared, and appropriate remedial actions are undertaken.

Read errors may occur for a number of different reasons. For example, read errors may be caused by a defect, such as an asperity on the disc at or near the location on the disc where the desired data has been written. Read errors may also occur due to the inaccurate or erroneous positioning of the read transducer relative to the data that is to be read. This may be due either to incorrectly positioning the read transducer at the time the read operation is performed or, more commonly, as a result of an off-track write, where the data is inadvertently written at an incorrect radial location relative to the center of the track.

When a read error occurs during a read operation in a disc drive, a number of different read error recovery techniques may be employed to correct the error. For example, in the simplest case, after a read error has occurred with respect to a data sector, the read transducer is maintained at its current location and the data sector is simply read again the next time the data sector rotates beneath the read transducer. That is, a read retry operation is performed with respect to the data sector. Another technique that may be employed involves performing a read retry operation while adjusting various read processing parameters. Yet another technique that may be employed involves moving the transducer a slight distance from its current location (performing an offset operation) and then performing a read retry operation. Performing track offset and retry operations together is a particularly useful technique in cases where the data associated with the erroneous read operation has been inadvertently written off track.

There are a number of processes that may be used to perform offset/read retry operations. In accordance with one method, after a read error is detected with respect to a given data sector on a track, the read transducer is offset a predetermined distance from the center of the track, for example 4% of track pitch (4% TP), and a first read retry operation is performed with respect to the given sector. If the first read retry reads the given sector without a read error, the process ends. If, however, the first read retry operation produces a read error, the read transducer is then offset 4% TP from track center on the opposite side of the track center from the first offset, and a second read retry operation is performed. If the second read retry operation produces an read error, the read transducer is then offset 8% TP on the opposite side of the track, and a third read retry operation is performed. If the third read retry operation produces an read error, the read transducer is then offset 8% TP on the opposite side of the track center from the first offset, and another read retry operation is performed. This same process of moving the read transducer back and forth to opposite sides of the track center in ever increasing increments of track pitch is continued until either a read retry successfully reads the data, or until a predetermined number of retry operations have been performed.

There are a number of drawbacks associated with this offset/read retry process. First, sweeping the read transducer back and forth across the track center to perform the read retry operation in this manner can result in unwanted resonance in the mechanical components of the disc drive. The mechanical resonance may induce noise into the servo positioning system, thus making it increasingly difficult to position the read transducer accurately. Additionally, the mechanical resonance may cause undesirable audible vibrations to occur in the disc drive. Secondly, since a full rotation of the disc must occur for each retry operation, a significant amount of rotational latency may be incurred if a successful read retry operation is not achieved early in the retry process.

Another offset/read retry process that may be used involves first performing a predetermined number of offset/retry operations, on one side of the track center, and then performing the same number of offset/retry operations on the opposite side of the track center. In accordance with this process, each offset moves the read transducer an identical predetermined distance from its previous radial position. For example, a first offset may move the transducer 4% TP from the track center to a first radial location, the next offset will move the transducer 4% TP from the first radial location to 8% TP from the track center, and so on. After a predetermined number off offset/retry operations have been performed on one side of the track, the transducer is moved to other side of the track and the process is repeated. As with the previously described offset/retry process, anytime during the process when a non-erroneous retry operation is performed, the process ends.

As will be recognized, since this offset/read retry process does not sweep the read transducer back and forth across the track center each time a read retry operation is performed, the unwanted resonance associated with the first offset/read retry process is avoided. Additionally, this offset/read retry process will typically take half the time to complete than the previously described offset/read retry process in the case where a successful read retry operation occurs on side of track where the process began. That is, this offset/read retry process will be faster than the previously described offset/read retry process when the process begins on the "correct" side of track center. However, the other 50% of the time, where the process does not begin on the "correct" side of track center, and in the case where a successful read retry operation is never performed, this offset/read retry process may take the same amount of time as the previously described offset/read retry process.

Accordingly there is a need for a offset/read retry process that quickly determines the "correct" side of the track center on which a successful read retry operation may be achieved, and which minimizes the time need to reach a position on the "correct" side of the track center where the successful read retry achieve is achieved.

SUMMARY OF THE INVENTION

Against this backdrop the present invention has been developed. In accordance with various embodiment of the present invention, systems and methods for performing read retry operations with respect to a data sector in a data storage device use estimates of bit error rates determined during previous attempts to read data from the sector to determine an optimal distance and direction to move a read transducer for a subsequent read retry operation with respect to the data sector. In accordance with one embodiment, a method for determining an optimal position for a read retry operation in the data storage device includes estimating a first bit error rate (BER) value associated with a read operation performed with respect to the data sector while a read transducer is positioned at a first radial position. Next, an estimate is obtained of a second BER value associated with a first read retry operation performed with respect to the data sector while the read transducer is positioned at a second radial position. A determination is then made of both a distance and direction to move the read transducer to a third radial position to perform a second read retry operation with respect to the data sector based on the first and second BER values.

By using two BER values associated with unsuccessful read operations, a determination can quickly be made as to which side of the track to move the read transducer to perform another read retry operation. Additional embodiments use these same two BER values to determine an optimal distance to move the read transducer from its current location to perform another read retry operation.

In accordance with various embodiments, the estimation of BER values can be made quickly in the data storage using a channel quality monitor.

These and various other features as well as advantages which characterize the present invention will be apparent from a reading of the following detailed description and a review of the associated drawings.

DETAILED DESCRIPTION

Figure 1:
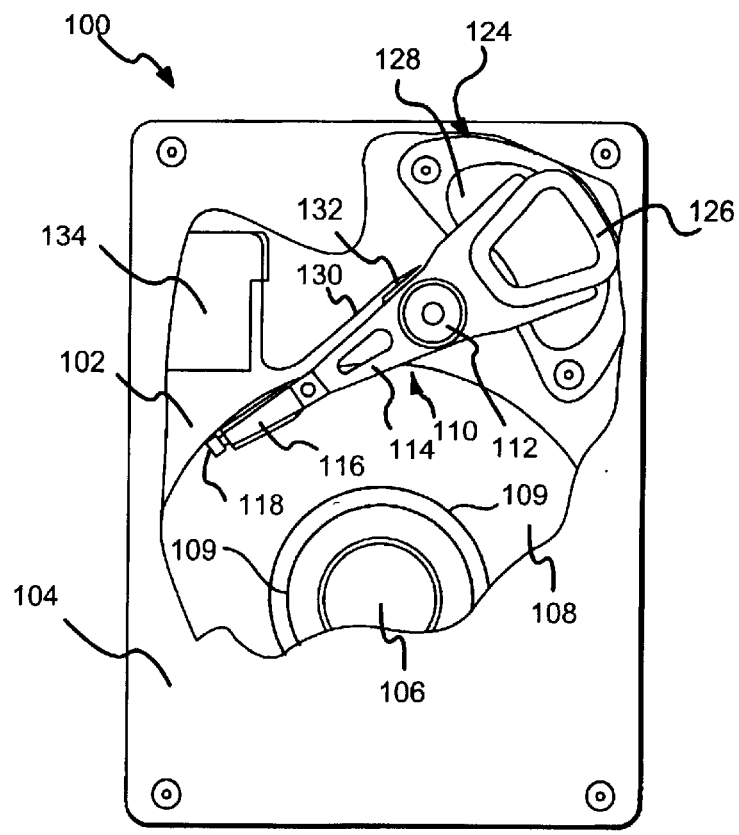
FIG. 1 is a top plan view of a disc drive constructed in accordance with the preferred embodiment of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a read/write head 118 which includes an air bearing slider enabling the head 118 to fly in close proximity above the corresponding surface of the associated disc 108.

During a seek operation, the position of the read/write heads 118 over the discs 108 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

As shown in FIG. 1, located on the surface of the discs 108 are a plurality of nominally circular, concentric tracks 109. Each track 109 preferably includes a number of servo fields that are periodically interspersed with user data fields along the track 109. The user data fields are used to store user data and the servo fields used to store prerecorded servo information used by a disc drive servo system to control the position of the read/write heads.

Figure 2:
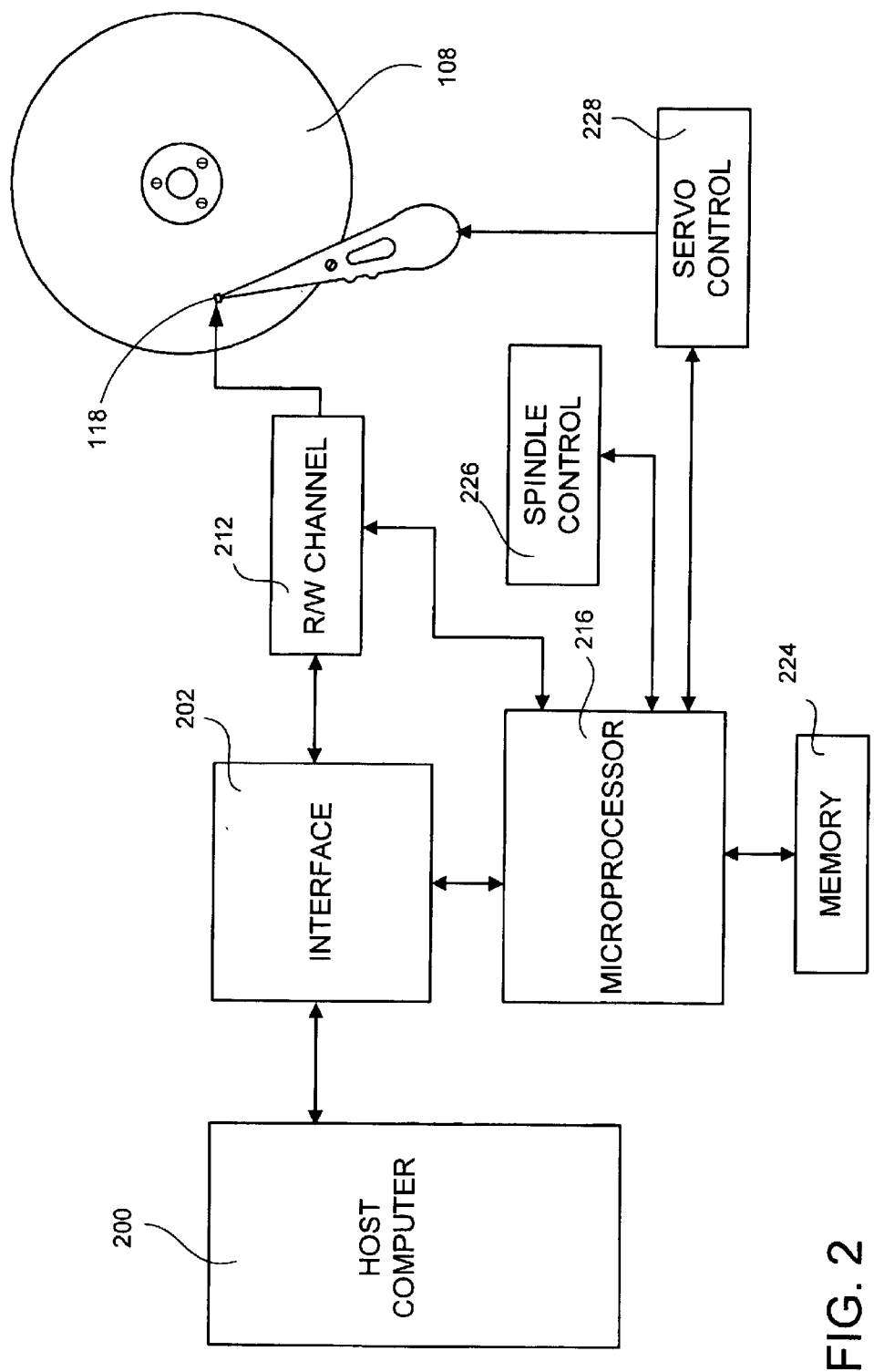
FIG. 2 is a functional block diagram of the disc drive of FIG. 1.

FIG. 2 provides a functional block diagram of the disc drive 100 of FIG. 1, operably connected to a host computer 200. As shown in FIG. 2, the disc drive 100 generally comprises or includes circuits or modules for spindle control 226, servo control 228 and read/write channel control 212, all operably connected to a system microprocessor 216. Additionally, an interface 202 is shown connected to the read/write channel 212 and to the system microprocessor 216, with the interface circuit 202 serving as a conventional data interface and buffer for the disc drive 100. As will be recognized, the spindle control 228 controls the rotational speed of the spindle motor 106 (FIG. 1).

In operation of the disc drive 100, the servo control 228 receives servo position information from the tracks 109 via the read/write heads 118 and, in response thereto, provides a correction signal to the actuator coil 126 in order to position the heads 118 with respect to the discs 108 (FIG. 1). The read/write channel 212 operates to write data to the tracks 109 in response to user data provided to the channel from the interface 202 by encoding and serializing the data and generating a write current utilized by the heads 118 to selectively magnetize portions of a selected track 109 on the discs 108. Correspondingly, data previously stored on a track 109 are retrieved by the read/write channel 212 by reconstructing the data from the read signals generated by a head 118 as the head pass over the selected track 109 on the disc 108. The operation of the read/write channel 212 in accordance with the preferred embodiment of the present invention will be discussed in greater detail below.

It will be noted that the various operations of the disc drive 100 may be controlled by the microprocessor 216, in accordance with programming stored in system microprocessor memory (MEM) 224. Those skilled in the art will recognize that typical disc drives include additional circuitry and functions beyond those delineated above, but such are only of general interest to the present discussion and accordingly do not warrant further description.

Returning now to the read/write channel 212, those skilled in the art will appreciate that modem read/write channels often include functionality for estimating the bit error rate (BER) associated with data that is being read from a data sector on a track 109 of the disc 108, during a read operation. The mechanisms or algorithms that typically make this determination are commonly referred to as channel quality monitors, or simply quality monitors. Quality monitors are typical a part or a function of a disc drive's read channel. Quality monitors typically provide a value, referred to herein as the quality monitor (QM) value, that is an estimate of the BER associated with the reading of a given block of data from the disc, such as a data sector.

The manner in which various quality monitors estimate BERs and produce the QM values varies and is largely dependent on the manner in which the type of read channel employed in the disc drive. For example, two common types of read channels, Peak Detection read channels and Partial Response Maximum Likelihood (PRML) read channels, use two very different techniques for converting analog signals read from the disc into digital data. Each different technique for converting analog signals read from the disc into digital data requires a different technique or different circuitry for estimating the BER of the data read from the disc.

It should be understood, that the present invention is not limited to any particular type of read channel or any particular type of quality monitor. Furthermore, while various embodiments are described herein as determining or estimating BERs using QM values, other methods of estimating or determining BERs may be used. In this respect, any type of read channel and/or any type of quality monitor that is operable to produce a value that is indicative of the BER of data being read from the disc may be used in accordance with the present invention. However, for clarity, one such read channel that may be employed in the disc drive 100 to produce a QM value will now be described.

Figure 3:
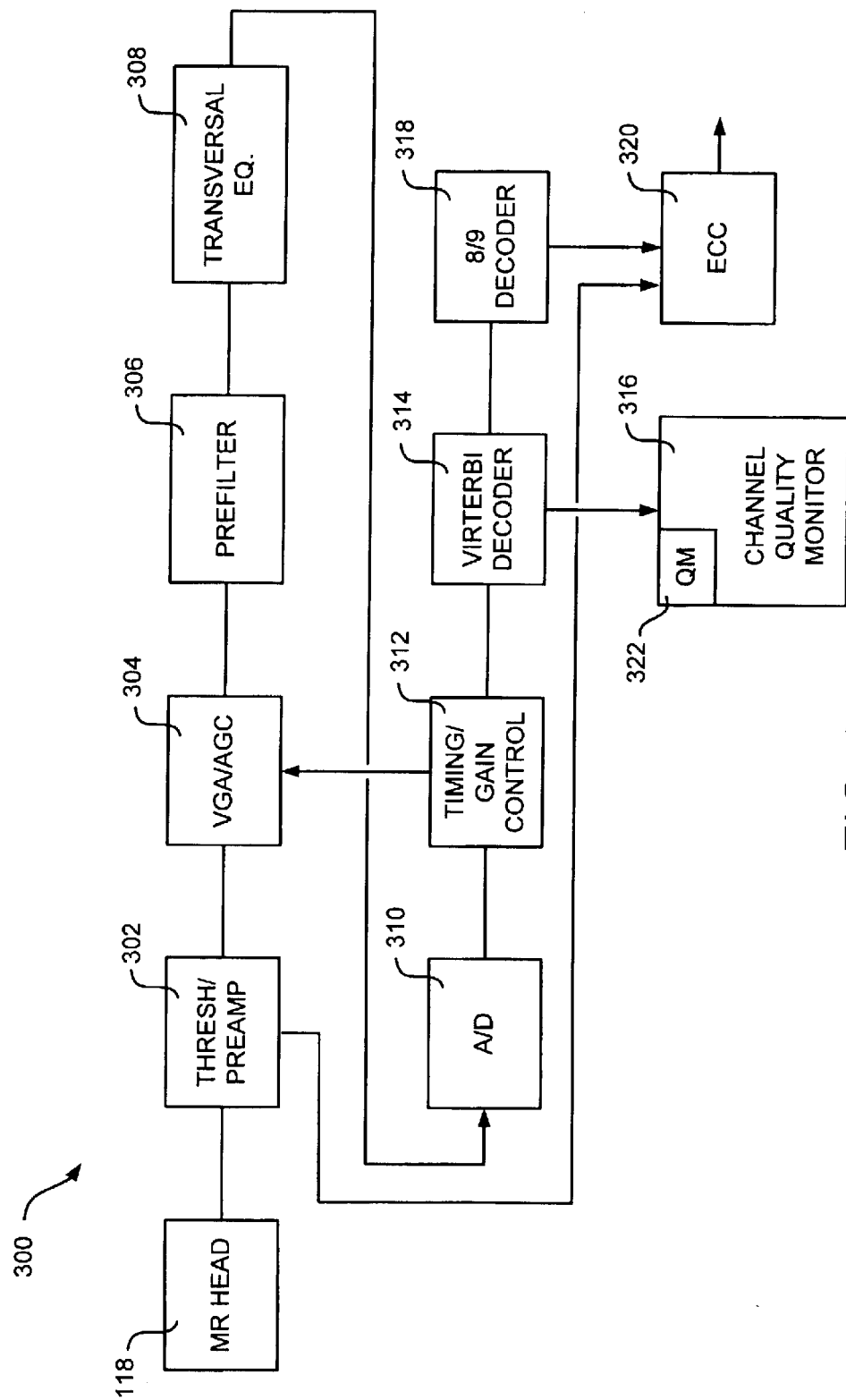
FIG. 3 is a functional block diagram of the read channel portion of the read/write circuit of FIG. 2.

Referring now to FIG. 3, shown therein is a functional block diagram of one possible read channel 300 of the disc drive 100. The read channel 300 comprises the readback portion of the read/write channel 212 of FIG. 2. It will be recognized that additional components and features may typically be provided in the read channel 300 and further, selected operations of several of the components disclosed in FIG. 3 are controlled with external inputs provided from, for example, by the system microprocessor 216 of FIG. 2.

In this embodiment, the read channel 300 employs PRML signal processing, which involves time-domain equalization and self-synchronization of the read signal provided by the heads 118. Particularly, time-domain equalization is used to reshape a readback signal received by the channel to an approximation of a desired target waveform in the time domain, such as used in PRML PR-4 detection. Reshaping the readback signal allows intersymbol interference (ISI) to be reduced and controlled, facilitating reliable sequential decoding of the digital information stored on the discs 118. Such time-domain equalization is typically implemented through the use of a transversal equalizer/filter circuit. Moreover, self-synchronization involves synchronization of the rate of data recovery with the rate of incoming readback signals, which varies as a result of the speed of the rotating disc and the radial position of the associated head. Typically, such self-synchronization is practically achieved through the use of a phase locked loop (PLL) which generates clock signals for the sampling of equalized signals at appropriate moments and for the subsequent recovery of the stored data from the samples by way of a Viterbi decoder.

Continuing with FIG. 3, the read channel 300 is shown to comprise a threshold detector and preamp circuit 302 which operates to monitor the variations in the read current passing through the head 118, which is identified in FIG. 3 as an MR head. The detector and preamp circuit 302 provides both threshold detection and preamplification of the signal provided by the head 118. More particularly, the detector and preamp circuit 302 monitors the variations in magnitude of current passing through a MR-element of the head 118 and provides indications when the current exceeds a predetermined threshold bounding the nominal read current. Thus, the threshold and preamp circuit 302 utilizes a predetermined signal level threshold for the read current and provides indications when the threshold has been exceeded. Additionally, the threshold and preamp circuit 302 provides preamplification of a read signal from the head 118 to a level sufficient for processing by the remainder of the read channel 300.

The output signal from the threshold and preamp circuit 302 is provided to a variable gain amplifier (VGA) 304, which typically includes automatic gain control (AGC) to maintain a nominal signal amplitude for the remainder of the read channel 300. The amplified signal is then prefiltered by an adaptive prefilter 306 which generally operates as a low pass filter to remove higher frequency noise components from the signal. A transversal equalizer 308 then performs the aforementioned time-domain equalization of the readback signal, filtering the signal to a close approximation of a selected class of PRML signaling (such as PR-4). The output of the transversal equalizer 308 is sampled (digitized) by an analog to digital (A/D) converter 310, and these samples are used by a timing and gain control circuit 312 to adjust the gain of the VGA 304, as well as to adjust the frequency of a PLL (not separately shown) used by a Viterbi decoder 314 to decode read data from the samples obtained from the transversal equalizer 308.

The output from the Viterbi decoder 314 will optimally comprise a data sequence corresponding to the encoded data originally written to the selected track. This sequence is provided to a channel quality monitor 316 which, as will be recognized, performs a running assessment of the channel quality using error values provided by the Viterbi decoder 314. More particularly, the channel quality monitor 316 generates a status byte which represents the integral, or sum, of the square of the sampled data bit error values recovered during the read operation. The magnitude of this status byte ("channel quality measurement") is representative of the overall quality of the data signal during the read event; a lower magnitude corresponds to a higher quality signal. Because the individual sample errors are squared, larger errors generally carry much more significance than smaller errors in the overall count.

For example, if the A/D 310 produces sample values over a symmetrical integer range (such as −18 to +18), then every sample received by the Viterbi decoder 314 should have one of three values corresponding to symbol values of −1, 0 and +1 (such as −14, 0, or +14). Thus, samples other than these will have non-zero error values.

The Viterbi decoder 314 examines each sequence of sampled data values and determines the sequence of −1, 0, and +1 symbol values which most likely produced the recovered sequence. Once the Viterbi decoder 314 has determined the symbol values, it can determine the corresponding error values, and those error values are provided to and squared by the channel quality monitor 316 where they are added to a summing register to provide a quality measurement value, identified as $Q_m$ 322.

It is advantageous to linearly scale the squared error values before being summed and then to linearly scale the resulting sum, so that the final status fits in a single-byte register. When a new sector of data is read, the channel quality monitor 316 clears the summing register $Q_m$ 322 during receipt of the associated phase-locked loop (PLO) recovery field and then begins adding the calculated squares of the error values when data recovery begins. As desired, a root mean squared (RMS) integral of error can readily be determined for the quality measurement by further dividing the sum by the total number of bits received and then taking the square root of this value. It will be recognized that the calculation of the QM value is generally known in the art.

Figure 4:
FIG. 4 is graphical representation of the correlation between channel quality measurement and read error rate for the read channel of FIG. 3.

Regardless of the manner in which the channel quality monitor 316 determines the QM value, it is possible to experimentally correlate the channel quality measurement to the overall channel read error rate. For purposes of illustration, FIG. 4 provides a graphical representation of the correlation between QM value and the bit error rate (BER) for the disc drive 100. As shown in FIG. 4, a QM value of about 78 corresponds to a BER of about $1 \times 10^{-11}$ read errors/bit retrieved from the read channel 300, whereas a QM value of about 90 corresponds to BER of about $1 \times 10^{-9}$ read errors/bit.

Continuing with FIG. 3, the recovered data sequence is provided by the Viterbi decoder 314 to a conventional 8/9 decoder 318, which converts each set of 9 bits stored to the disc 108 back to the original 8 bits of user data to remove the RLL encoding used to ensure reliable timing during the read recovery process. Although 8/9 encoding has been disclosed, it will be understood that other encoding rates can readily be utilized, such as 16/17. The output from the 8/9 decoder 318 is shown to be provided to an ECC circuit 320, which performs error detection and correction upon the received sequence (using, for example, Reed-Solomon codes) and, if no uncorrectable errors are present, outputs the data to the interface circuit 202 (FIG. 2) for subsequent transfer to the host computer 200.

Having concluded an initial overview of on possible read channel 300 that may be used in accordance with the present invention, various embodiments of the present invention will now be described, each of which involves the use of QM value to aid in determining an optimal position or positions on the disc at which to position the read transducer for performing a read retry operation.

As discussed above, when a read error occurs in a disc drive with respect to a particular data sector, it is common to employ various techniques to attempt to recover the data in the sector containing the erroneous data. One such technique involves simple attempting to reread the data, one or more times, while leaving the read transducer at the same radial position on the disc as was used during the initial failed read operation. If rereading the data in this manner fails, the read transducer may be positioned at a radial position near, but not at, the radial position where the read operation initially failed. As will now be described with respect to FIGS. 5, 6, and 7, various embodiments of the present invention relate to systems and methods for dynamically performing read retry operations at optimal positions relative to the radial position on the disc where an initial data read error has occurred.

Figure 5:
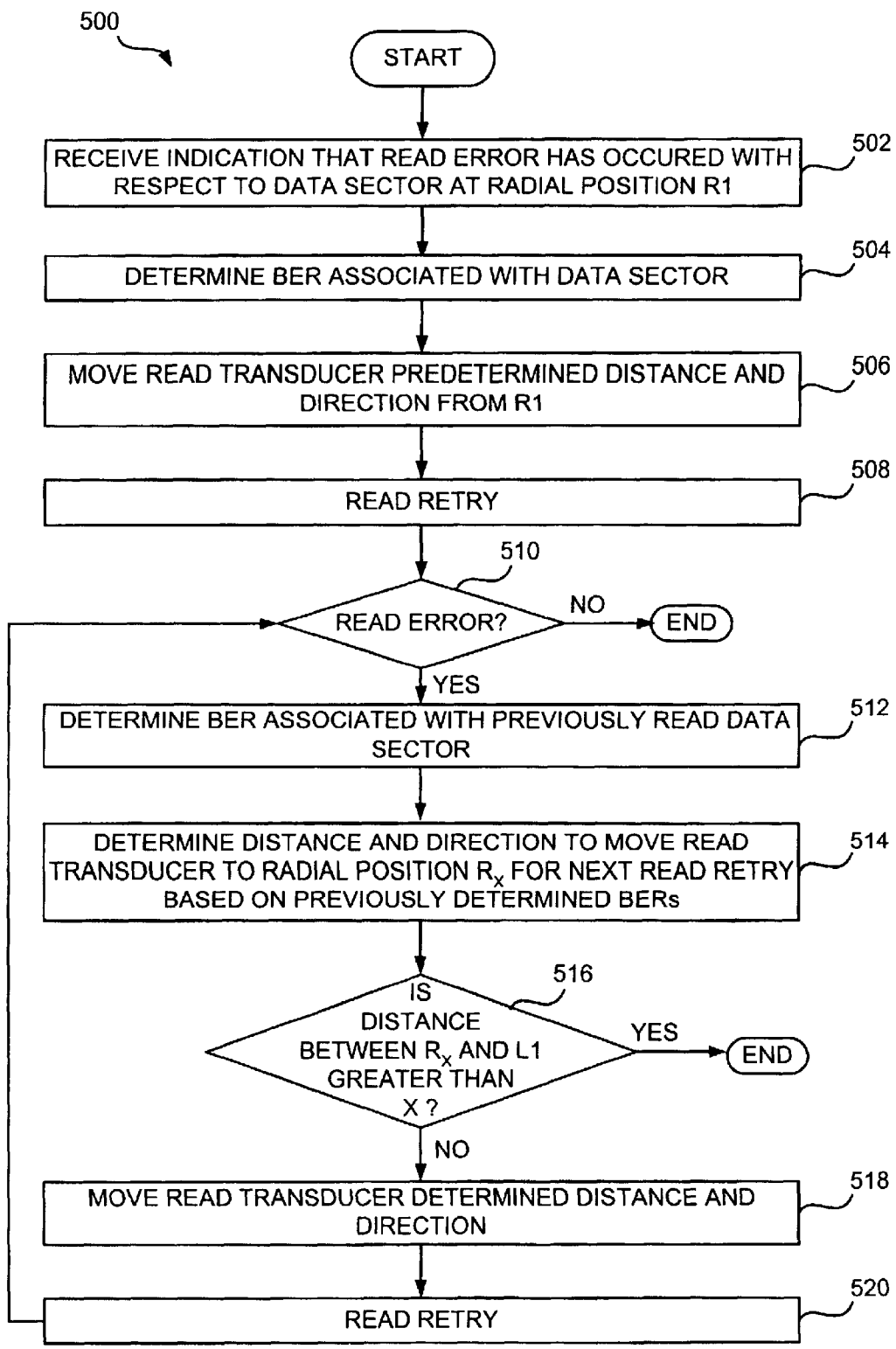
FIG. 5 illustrates an operational flow of a first read error recovery routine in accordance with an embodiment of the present invention.
Figure 6:
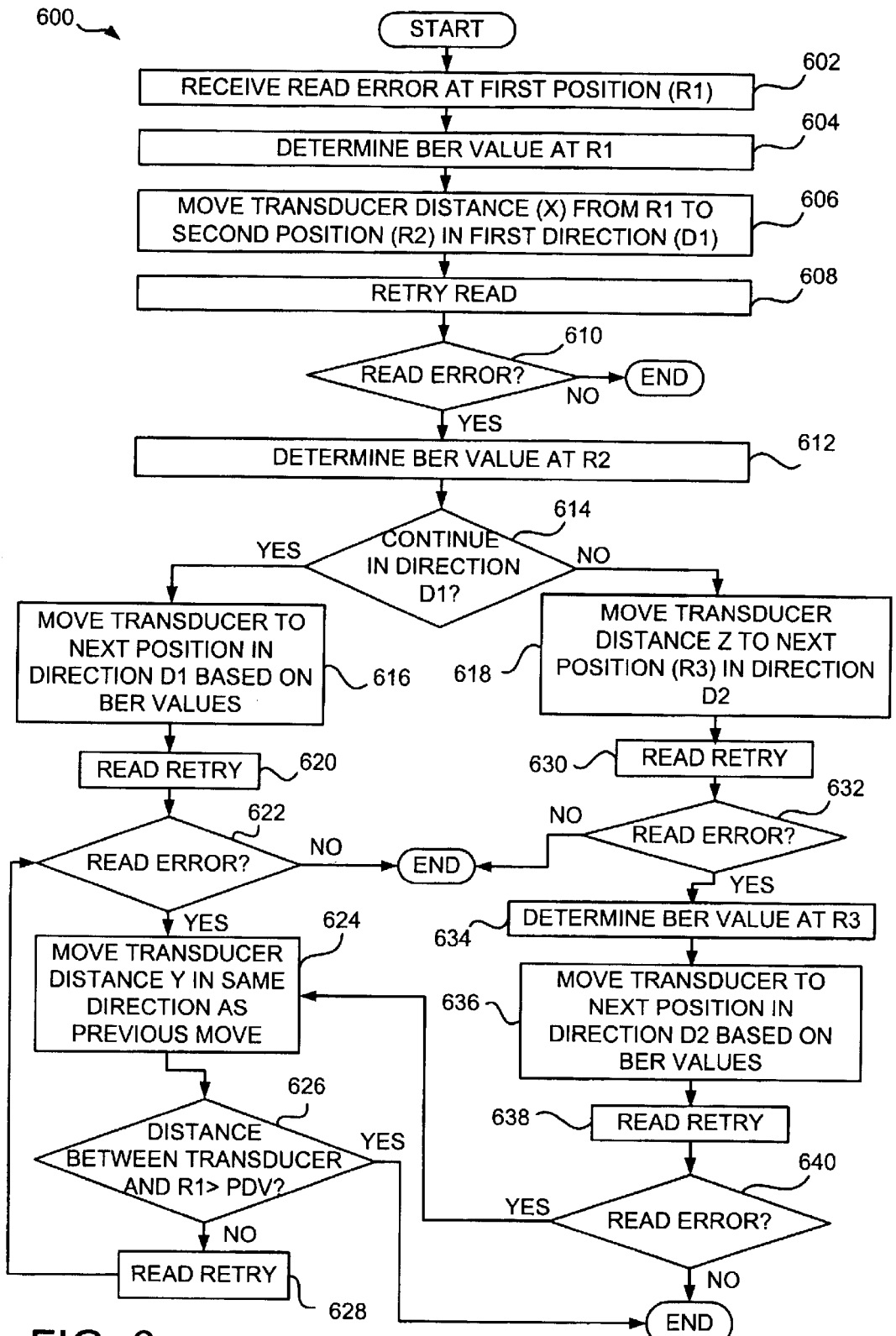
FIG. 6 illustrates an operational flow of another read error recovery routine in accordance with another embodiment of the present invention.
Figure 7:
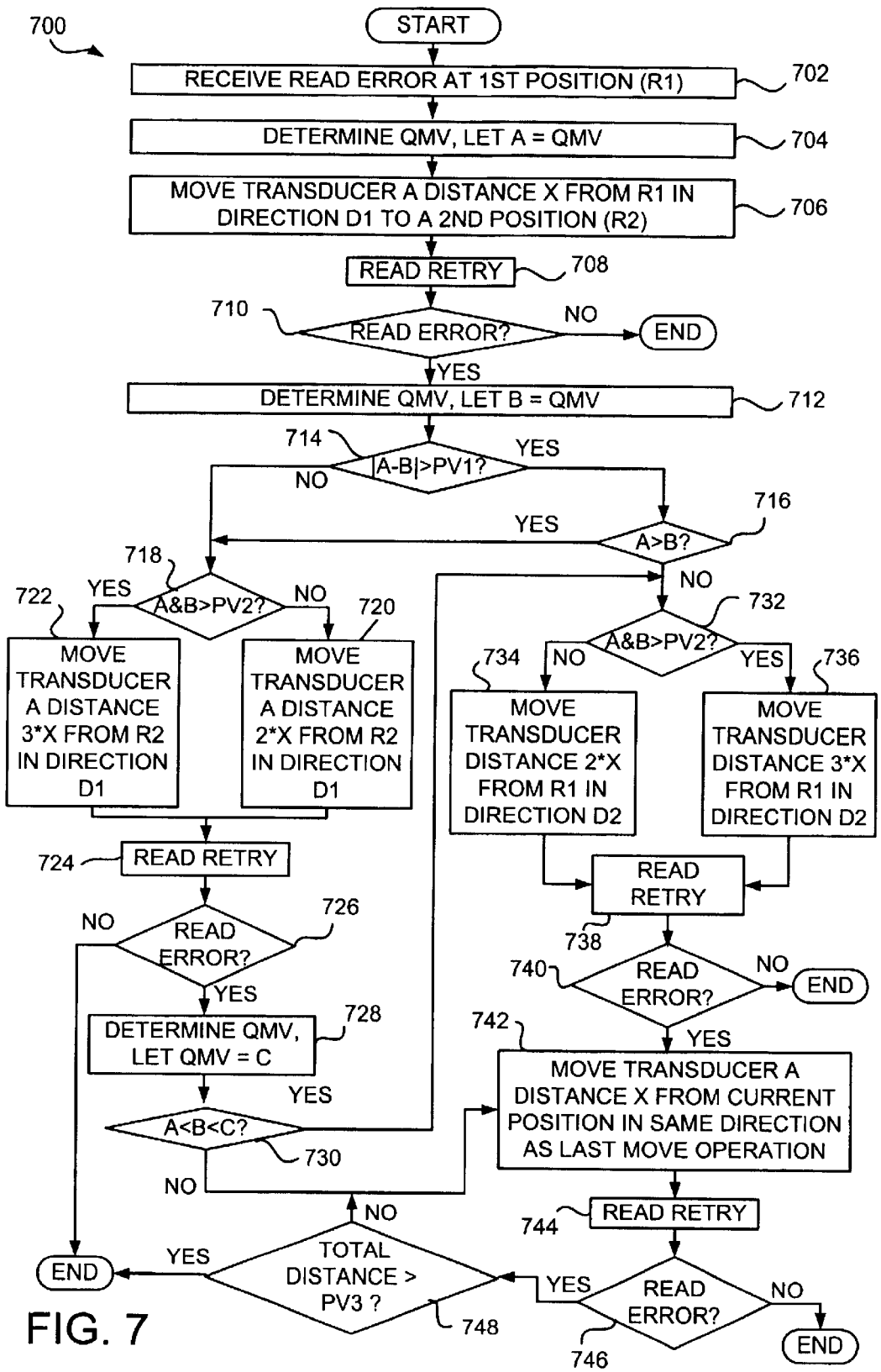
FIG. 7 illustrates an operational flow of yet another read error recovery routine in accordance with yet another embodiment of the present invention.

Each of FIGS. 5, 6 and 7 illustrate an operational flow exemplifying a method related to performing read retry operations in the disc drive 100. The operations shown in FIGS. 5, 6 and 7 may be implemented (1) as a sequence of microprocessor implemented acts or program modules running on one or more microprocessors and/or (2) as interconnected machine logic circuits or circuit modules within the disc drive. For example, as will be described, various of the operations shown in FIGS. 5, 6 and 7 may be performed by the microprocessor 216 and/or the read/write channel 212. Alternatively, the operations shown in FIGS. 5, 6 and 7 may be implemented performed by other hardware, software or firmware in the disc drive 100. Accordingly, the operations described may be referred to variously as operations, routines, structural devices, acts, or modules. The implementation of the operations shown in FIGS. 5, 6, and 7 is a matter of choice dependent on performance requirements and/or hardware and software capabilities of the disc drive 100. While some of the operations shown are preferably implemented as software stored on a computer readable medium, it will be recognized by one skilled in the art that these operations may be implemented in software, in firmware, in special purpose digital logic, or any combination thereof without deviating from the spirit and scope of the present invention, as recited in the claims attached hereto. As used herein, computer readable medium may be any available medium that can store or embody computer-readable instructions.

Turning now to FIG. 5, illustrated therein is an operational flow 500 exemplifying one method of performing a read retry operation in accordance with an embodiment of the present invention. As shown, at the start of the operational flow 500 a receive operation receives an indication that a read error has occurred with respect to a data sector on a particular track 109 in the disc drive 100. As will be appreciated, the read operation during which the read error occurred will have been performed by a read transducer 118 at a specified radial position (R1) along the disc 109.

With respect to the various embodiment of the present invention described herein, a determination that a read error has occurred, and thus an indication that a read error has occurred, may be the result of a single read error with respect to the data sector or, alternatively, it may be the result of a number of read errors with respect to the data sector. Additionally, a determination and/or indication that a read error has occurred may be the result of a "raw" data read of the data sector, where no error correction has been attempted or, alternatively, may be the result of a failure to correctly read the data from the sector even after error correction has been attempted on the data read from the data sector.

After an indication that a read error has occurred has been received at operation 502, a BER determination operation 504 determines a BER associated with the erroneous data read from the data sector while the transducer was at radial position R1. The determination of the BER may be made in a number of different ways. For example, in a preferred embodiment, the BER will be determined using a quality monitor as described above. In such a case, the BER may be represented as a QM value, rather than a BER value. Next, a move operation 506 causes the read transducer to be moved a predetermined distance and direction from radial position R1. For example, and without limitation, move operation may cause the transducer to be moved a given percentage of track pitch from radial position R1 towards either the inner diameter (ID) or outer diameter (OD) of the disc. Following the move operation 506, a read retry operation 508 is performed with respect to the data sector.

Following the read retry operation 508, a read error determination operation 510 determines whether the read retry operation 508 resulted in a read error. If it is determined in the determination operation 510 that the read retry operation preceding the determination operation 510 did not result in a read error, the operational flow 500 ends. However, if it is determined in the determination operation 510 that the read retry operation 508 preceding the determination operation 510 did result in a read error, a determine BER operation 512 determines a BER associated with the erroneous data read during the read retry operation 508.

Next, a retry position determination operation 514 determines the radial distance and, in some cases, the direction in which the read transducer is to be moved from its current radial position to perform another read retry operation. In general, the determination of the direction in which the read transducer is to be moved is based on a comparison of the relative magnitudes of BERs determined in previous operations. For example, if it is determined that the BER is decreasing each time a read retry operation is performed after moving the transducer in a first direction, this will indicate that continuing to move the transducer in the first direction for the next read retry operation will likely produce a better BER, and/or a read operation that is not in error. As such, the determination operation 514 will determine that the transducer is to be moved in first direction the next time the move operation 518 is performed. Conversely, if it is determined that the BER is increasing each time a read retry operation is performed after moving the transducer in the first direction, this will indicate that continuing to move the transducer in the first direction for the next read retry operation will likely produce a worse BER.

The determination of direction by the determination operation 514 may made each time the position determination operation 514 is performed or, alternatively may be made only under specific operational conditions. For example, the position determination operation 514 may only determine the direction the transducer is to be moved after the first two or three retry operations have been performed. Preferably, the position determination operation 514 will only determine the direction the transducer is to be moved after BER operations 506 and 512 have been performed.

In addition to determining the direction of travel of the read transducer for the next retry operation, the determination operation 514 also determines the precise radial distance that the transducer is to be moved from its current location for the next retry operation at location $R_X$. As will be appreciated to those skilled in the art, the radial distance is the distance along the path of travel of read transducer as it is moved across the disc, such as between tracks. This distance may be expressed in a number of different ways, but is typically expressed in percentage of track pitch (% TP).

The determination of the radial distance may be made by the determination operation 514 in a number of ways. In one embodiment, the radial distance may be determined based on the magnitudes of the BERs determined in prior BER determination operations. For example, the radial distance may be directly proportional to the difference between the magnitudes of BERs associated with two immediately preceding read retry operations. That is, the greater the difference between the magnitudes of BERs, the larger the distance the read transducer is to be moved from its current radial position to another radial position to perform another read retry operation. As will be understood, the precise distance the read transducer is to be moved in accordance with the retry position determination operation 514 will vary depending on various physical and operational parameters of the disc drive 100.

Following the determination operation 514, a limit distance traveled operation 516 determines whether the distance between the original position of the read transducer L1 and the radial position $R_X$ of the next of the next retry operation 520 is greater than a predetermined value X. In general, the limit distance traveled operation 516 is used to ensure that the transducer is not moved too far off track, such that the transducer would be reading data from an adjacent track during the subsequent retry operation 520. If the limit distance traveled operation 516 determines that the distance between L1 and $R_X$ is greater than X, the operation flow 500 ends. However, if the limit distance traveled operation 516 determines that the distance between L1 and $R_X$ is not greater than X, the operation flow 500 continues to move operation 518, where the read transducer is moved the determined distance and direct determined in position determination operation 514.

In an alternative embodiment of the limit distance traveled operation 516, rather than determining whether the distance between L1 and $R_X$ is greater than X, the position determination operation 514 will determine whether the number of read retry operations has exceeded a given number. If the number of read retry operations has exceeded the given number, the operational flow 500 will end. However, if the number of read retry operations has not exceeded a given number, the operation flow 500 continues to move operation 518.

In yet another alternative of the limit distance traveled operation 516, a determination will be made as to whether the number of retry operations has exceeded a given number or whether the distance between L1 and $R_X$ is greater than X. In this embodiment, the operation flow 500 will end if either the number of retry operations has exceeded the given number or the distance between L1 and $R_X$ is greater than X. If, however, the number of retry operations has not exceeded the given number and the distance between L1 and $R_X$ is not greater than X, the operation flow 500 continues to move operation 518.

Following the move operation 518, read retry operation 520 is performed with respect to the data sector, and the operational flow continues back to read error determination operation 510. Those skilled in the art will appreciate that together, operations 510, 512, 514, 516, 518, and 520 form an operational loop. It will also be appreciated that the operations in this operational loop will continue to be performed as described until either the determination operation 510 determines that the read retry operation preceding the determination operation 510 did not result in a read error, or until the limit distance traveled operation 516 results in a positive (YES) result.

Turning now to FIG. 6, illustrated therein is an operational flow 600 exemplifying a method of performing a read retry operation in accordance with another embodiment of the present invention. As shown, at the start of the operational flow 600 a receive operation receives an indication that a read error has occurred with respect to a data sector being read at a first radial position R1 by the read transducer 118 in the disc drive 100. Next, a BER determination operation 604 determines a BER value associated with the erroneous data read from the data sector while the transducer was at the first position R1. The determination of the BER value may be made in a number of different ways. For example, in a preferred embodiment, the BER value will be determined using a quality monitor as described above. In such a case, the BER value may be represented as a QM value, rather than a BER value.

Following the determination operation 604, a move operation 606 causes the read transducer to be moved from its first position at R1 to a second position at R2, where R2 is a predetermined distance X from R1. The precise value X will be dependent on various physical and operational parameters of the disc drive 100. This distance X may be expressed in a number of different ways, but is preferably expressed in percentage of track pitch (% TP). After the read transducer is moved to the second position at R2, a retry read operation 608 is performed with respect to the data sector.

Next, a read error determination operation 610 determines if a read error occurred with respect to the read operation 608. If it is determined in the determination operation 610 that a read error did not occur respect to the read operation 608, the operational flow 600 ends. However, if it is determined in the determination operation 610 that a read error did occur respect to the read operation 608, a BER value determination operation 612 then determines a BER value for the data read during the retry read operation 608.

Following the BER determination operation 612, a direction determination operation 614 determines if the transducer should continue in direction D1 for the next read retry operation. The determination of whether the transducer should continue in direction D1 may be made in a number of different ways. For example, the determination of the direction in which the read transducer is to be moved may be based on a comparison of the relative magnitudes of BER values determined in operations 604 and 612. If it is determined that the BER value determined in operation 612 is less than the BER value determined in operation 604, this will indicate that continuing to move the transducer in the direction D1 for the next read retry operation will likely produce a better BER value, and/or a read operation that is not in error. As such, the determination operation 614 will determine that the transducer is to continue in direction D1 and the operational flow will proceed to a move operation 616. Conversely, if it is determined that the BER value determined in operation 612 is not less than the BER value determined in operation 604, this will indicate that continuing to move the transducer in the direction D1 for the next read retry operation will likely produce a worse BER value. As such, the determination operation 614 will determine that the transducer is not to continue in direction D1 and the operational flow 600 will proceed to a move operation 618.

In an alternative embodiment of the direction determination operation 614, the determination of whether the transducer should continue in direction D1 for the next read retry operation may be made by determining not only whether the BER value determined in operation 612 is less than the BER value determined in operation 604, but also whether there is a significant enough difference between the magnitudes of the two BER values to indicate with some confidence that the magnitudes that have determined may be relied on. For example, in an alternative embodiment of the direction determination operation 614, a comparison of the relative magnitudes of BER values determined in operations 604 and 612 is first made. Next, the BER value determined in operation 604 is subtracted from the BER value determined in operation 604. The difference between the BER value determined in operation 604 and the BER value determined in operation 604 is greater than a predetermined number, this will indicate that continuing to move the transducer in the direction D1 for the next read retry operation will likely produce a worse (greater) BER value. As such, if it is determined in direction determination operation 614 that the difference between the BER value determined in operation 604 and the BER value determined in operation 604 is greater than a predetermined value (BER(R2)−BER(R1) >PDV), the operational flow will proceed from the direction determination operation 614 to a move operation 618. Conversely, if it is determined in direction determination operation 614 that the difference between the BER value determined in operation 604 and the BER value determined in operation 604 is not greater than a predetermined value (BER(R2)−BER(R1)=PDV), the operational flow 600 will proceed from the direction determination operation 614 to a move operation 616.

In the case where the determination operation 614 determines that the transducer is to continue in direction D1, the move operation 616 causes the read transducer to be moved from position in direction D1 to a new a radial position. The radial distance that the move operation 614 causes the read transducer to be moved is based on the BER values determined in the previous BER determinations 604 and 612. The determination of the radial distance is made dynamically by the determination operation 614, based on the difference between the magnitudes of BERs determined in BER determination operations 604 and 612. The radial distance may be determined in the determination operation 614 using either continuous or discrete methods. For example, using a continuous method, a distance determined by move operation 616 may have a value anywhere in a continuous range of values, based on an input of the difference between the magnitudes of BERs determined in BER determinations 604 and 612. In contrast, using a discrete method, a distance determined in move operation 616 would have a value corresponding to one of a number of predefined distances. In either case, radial distance that the move operation 614 moves the transducer will be dynamically determined based on the difference between the magnitudes of BERs determined in BER determinations 604 and 612.

Following the move operation 616, a read retry operation 620 causes a read retry of the data sector. A read error determination operation 622 then determines if a read error occurred with respect to the previous read retry operation 620. If the read error determination operation 622 determines that no read error has occurred, the operational flow 600 ends. However, if the read error determination operation 622 determines that a read error has occurred, a move operation 624 causes the read transducer to be moved in the same direction as it was moved in the last move operation preceding the move operation 624. The move operational will cause the read transducer to moved from its present radial position to a new radial position that is a predetermined distance Y from its previous radial position. This distance Y may be expressed in a number of different ways, but is preferably expressed in percentage of track pitch (% TP). The predetermined distance that the read transducer will be moved in accordance with the move operation 624 will preferably, all though not necessarily, be predetermined. For example, in one embodiment the distance that the read transducer will be moved in accordance with the move operation 624 will be X (Y=X), as described above with respect to the move operation 606. In other embodiments the distance that the read transducer will be moved in accordance with the move operation 624 will be a predetermined value other than X.

After the read transducer has been moved in accordance with the move operation 624, a distance determination operation 626 will determine if the distance between the present radial position of the read transducer and the radial position R1 is greater than a predetermined distance value (PDV). That is, the distance determination operation 626 will determine if the read transducer is greater than a predetermined distance from its position at the start of the operational flow 600. The PDV may be expressed in a number of different ways, but is preferably expressed in percentage of track pitch (% TP). If it is determined in the distance determination operation 626 that the distance between the present radial position of the read transducer and the radial position R1 is greater than the PDV, the operational flow 600 ends. As such, the distance determination operation 626 sets a limit to the distance the read transducer will be allowed to travel in the operational flow 600, thus preventing the transducer from inadvertently reading data from an adjacent track during a subsequent retry operation 628.

If it is determined in the distance determination operation 626 that the distance between the present radial position of the read transducer and the radial position R1 is not greater than the PDV, a read operation 628 causes a read retry of the data sector. Following the read operation 628, the operational flow 600 continues back to the read error determination operation 622. Those skilled in the art will appreciate that together, operations 622, 624, 626, and 628 form an operational loop. It will also be appreciated that the operations in this operational loop will continue to be performed as described until either the determination operation 622 determines that the read retry operation preceding the determination operation 620 or 628 did not result in a read error, or until the distance determination operation 626 determines that the distance between the present radial position of the read transducer and the radial position R1 is greater than the PDV.

Returning back now to the direction determination operation 614, if it is determined therein that the transducer should not continue in direction D1 for the next read retry operation, the operational flow will precede to the move operation 618. The move operation causes the read transducer to moved from its present radial position to a new radial position that is a predetermined distance Z from its previous radial position. This distance Z may be expressed in a number of different ways, but is preferably expressed in percentage of track pitch (% TP). The predetermined distance that the read transducer will be moved in accordance with the move operation 618 will preferably be greater than the distance Y, described above with respect to the move operation 624. For example, in one embodiment the distance that the read transducer will be moved in accordance with the move operation 618 will be twice Y (Z=2*Y). In other embodiments the distance that the read transducer will be moved in accordance with the move operation 618 will be a predetermined value other than Y.

Following the read operation 618, a read retry operation 630 causes a read retry of the data sector. Next, a read error determination operation 632 determines if a read error occurred with respect to the previous read retry operation 630. If the read error determination operation 632 determines that no read error has occurred, the operational flow 600 ends. However, if the read error determination operation 632 determines that a read error has occurred, a BER determination operation 634 determines a BER value for the data read during the retry read operation 630.

Next, a move operation 636 causes the read transducer to be moved in direction D2. The radial distance that the move operation 636 causes the read transducer to be moved is based on the BER values determined in the previous BER determinations 604 and 634. The determination of the radial distance is made dynamically by the determination operation 636, based on the difference between the magnitudes of BERs determined in BER determination operations 604 and 634. The radial distance may be determined in the determination operation 636 using either continuous or discrete methods. For example, using a continuous method, a distance determined by move operation 636 may have a value anywhere in a continuous range of values, based on an input of the difference between the magnitudes of BERs determined in BER determinations 604 and 636. In contrast, using a discrete method, a distance determined in move operation 636 would have a value corresponding to one of a number of predefined distances. In either case, radial distance that the move operation 636 moves the transducer will be dynamically determined based on the difference between the magnitudes of BERs determined in BER determinations 604 and 636.

Following the move operation 636, a read retry operation 640 causes a read retry of the data sector. If the read error determination operation 640 determines that no read error has occurred, the operational flow 600 ends. However, if the read error determination operation 640 determines that a read error has occurred, the operational flow continues to the move transducer operation 624. The operational flow 600 will then continue in accordance with the operational loop formed by operations 622, 624, 626, and 628, until either the determination operation 622 determines that the read retry operation preceding the determination operation 628 did not result in a read error, or until the distance determination operation 626 determines that the distance between the present radial position of the read transducer and the radial position R1 is greater than the PDV.

Turning now to FIG. 7, illustrated therein is an operational flow 700 exemplifying a method of performing a read retry operation in accordance with another embodiment of the present invention. As shown, at the start of the operational flow 700 a receive operation receives an indication that a read error has occurred with respect to a data sector being read at a first radial position R1 by the read transducer 118 in the disc drive 100. Next, a QM value determination operation 704 determines a first QM value (QMV=A) associated with the erroneous data read from the data sector while the transducer was at the first position R1. The determination of A may be made in a number of different ways. For example, in a preferred embodiment, A will be determined using a quality monitor, such as those known in the art and described above. In such a case, A will be representative of the quality of the data read from the data sector while the read transducer is at radial position R(1), such as an estimation of the BER of the data read from the data sector.

Following the determination operation 704, a move operation 706 causes the read transducer 118 to be moved in direction D1 from its first position at R1 to a second position at R2, where R2 is a predetermined distance X from R1. Direction D1 may either be toward the inner diameter (ID) of the disc 108 or toward the outer diameter (OD) of the disc. The precise value of X will be dependent on various physical and operational parameters of the disc drive 100. This distance X may be expressed in a number of different ways, but is preferably expressed in percentage of track pitch (% TP).

After the read transducer is moved to the second position at R2, a retry read operation 708 is performed with respect to the data sector. Next, a read error retry operation 708 causes a read retry of the data sector. A read error determination operation 710 then determines if a read error occurred with respect to the read operation 708. If it is determined in the determination operation 710 that a read error did not occur respect to the read operation 708, the operational flow 700 ends. However, if it is determined in the determination operation 710 that a read error did occur respect to the read operation 708, a QMV determination operation 712 then determines a QMV (QMV=B) for the data read during the retry read operation 708.

Following the QMV determination operation 712, a magnitude determination operation 714 determines if the absolute value of the difference between A and B (|A−B|) is greater than a predetermined value (PV1). The precise value of PV1 is dependent on various parameters of the disc drive 100. However, in general the value of PV1 will be chosen such that if the absolute values of A minus B is greater than PV1, the difference between A and B will be significant. If it is determined by the magnitude determination operation 714 that the absolute value of the difference between A and B is greater than the PV1 the operational flow continues to a comparison operation 716, which is described in greater detail below. However, if it is determined by the magnitude determination operation 714 that the absolute value of the difference between A and B is not greater than the PV1 the operational flow continues to a determination operation 718. In general, the determination operation 714 determines if there is a large discrepancy between the QMV determined in QMV determination operation 704 and the QMV determined in QMV determination operation 712.

In the case where the magnitude determination operation 714 determines that the absolute value of the difference between A and B is greater than the PV1, the comparison operation 716 than determines whether A is greater than B. By determining which is greater, A or B, a determination can be made as to which direction the transducer should be moved for a next read retry operation. For example, if A is greater than B, this indicates that by moving the transducer in direction D1 for the read retry operation 708, a better QMV result was obtained. As such, if the comparison operation 716 determines that A is greater than B, the operation flow 600 continues to the comparison operation 718, and then on to either move operation 720 or 722, where the transducer will continue to be moved in direction D1 for a subsequent read retry operation 724. However, if the comparison operation 716 determines that A is not greater than B, the operation flow 600 continues to the comparison operation 732, and then on to either move operation 734 or 736, where the transducer will be moved in the opposite direction D2 for a subsequent read retry operation 738.

In the case where the comparison operation 716 determines that A is greater than B, the comparison operation 718 then determines if both A and B are greater than a predetermined value PV2. If it is determined in the comparison operation 718 that both A and B are greater than a PV2, the move operation 722 causes the read transducer to be moved a radial distance three times the distance X (3*X) from position R2 in direction D1. However, if it is determined in the comparison operation 718 that either A or B, or both, are not greater than a PV2, the move operation 722 causes the read transducer to be moved a radial distance that is only two times the distance X (2*X) from position R2 in direction D1. In general, the comparison operation 718 is used to determine whether both A and B are large. If both A and B are large, this indicates that a larger radial move of the read transducer will preferably by made than if A and B are not both large.

Next, after either move operation 720 or 722 has been performed, a read retry operation 724 causes a read retry of the data sector. A read error determination operation 726 then determines if a read error occurred with respect to the read retry operation 724. If it is determined in the determination operation 726 that a read error did not occur respect to the read retry operation 724, the operational flow 700 ends. However, if it is determined in the determination operation 726 that a read error did occur respect to the read operation 724, a QMV determination operation 7728 then determines a QMV (QMV=C) for the data read during the read retry operation 724.

Following the QMV determination operation 726, a comparison operation 730 determines if C is greater than B, and whether B is greater than A (A<B<C). In general, the comparison operation 730 is determining whether continuing to move the read transducer in direction D1 will likely result in an improvement in a QMV in a subsequent read retry operation. If it is determined in the comparison operation 730 that C is not greater than B, and that B is not greater than A, the operation flow 700 continues to a move operation 742, which is described below. However, if it is determined in the comparison operation 730 that C is greater than B, and that B is greater than A, the operation flow 700 proceeds to the comparison operation 732, where a determination is made as to whether both A and B are greater than a predetermined value PV2. As previously described, the comparison operation 732 is also performed in the operational flow 700 if it is determined in comparison operation 716 that A is not greater than B.

If it is determined in the comparison operation 732 that both A and B are not greater than a predetermined value PV2, a move operation 734 then causes the read transducer to be moved a distance two times the predetermined distance X in direction D2, opposite direction D1. However, if it is determined in the comparison operation 732 that both A and B are greater than a predetermined value PV2, a move operation 736 then causes the read transducer to be moved a distance three times the predetermined distance X in direction D2, opposite direction D1. In general, as with the comparison operation 718, the comparison operation 732 is used to determine whether both A and B are large. If both A and B are large, this indicates that a larger radial move of the read transducer will preferably by made than if A and B are not both large.

Next, after either move operation 734 or 736 has been performed, a read retry operation 738 causes a read retry of the data sector. A read error determination operation 740 then determines if a read error occurred with respect to the read retry operation 738. If it is determined in the determination operation 740 that a read error did not occur respect to the read retry operation 738, the operational flow 700 ends. However, if it is determined in the determination operation 740 that a read error did occur respect to the read retry operation 738, a move operation 742 causes the read transducer to be moved a the predetermined distance X from its current radial position in the same direction as the last performed move operation.

Following the move operation 742, a read retry operation 744 causes a read retry of the data sector. A read error determination operation 746 then determines if a read error occurred with respect to the read retry operation 744. If it is determined in the determination operation 746 that a read error did not occur respect to the read retry operation 744, the operational flow 700 ends. However, if it is determined in the determination operation 746 that a read error did occur respect to the read retry operation 744, a distance limit determination operation 748 determines if the distance between the current radial position of the read transducer and the first position R1 is greater than a predetermined value PV3. That is, the distance limit determination operation 748 will determine if the read transducer is greater than a predetermined distance from its position at the start of the operational flow 700.

The predetermined value PV3 may be expressed in a number of different ways, but is preferably expressed in percentage of track pitch (% TP). If it is determined in the distance limit determination operation 748 that the distance between the present radial position of the read transducer and the radial position R1 is greater than the PV3, the operational flow 700 ends. However, if it is determined in the distance limit determination operation 748 that the distance between the present radial position of the read transducer and the radial position R1 is not greater than the PV3, the operational flow 700 proceeds back to move operation 742. As such, the distance limit determination operation 748 sets a limit to the distance the read transducer will be allowed to travel in any one direction away from its original position R1 during the operational flow 700, thus preventing the transducer from inadvertently reading data from an adjacent track during a subsequent retry operation.

Those skilled in the art will appreciate that together operations 742, 744, 746, and 748 form an operational loop. It will also be appreciated that the operations in this operational loop will continue to be performed as described until either the determination operation 746 determines that the read retry operation 744 preceding the determination operation 746 did not result in a read error, or until the distance limit determination operation 748 results in a positive (YES) result.

In summary, in view of the foregoing discussion it will be understood that a first embodiment of the present invention relates to a method for determining an optimal position for a read retry operation in a data storage device (such as 100). The data storage device includes a disc (such as 108) having a plurality of data sectors on the surface thereof. The data storage device also includes a read transducer (such as 118), moveable in either a first or second direction across the disc, for reading data from the data sectors. In accordance with this embodiment, the following operations are performed. A first bit error rate (BER) value associated with a read operation performed with respect to a data sector is while the read transducer is positioned at a first radial position is estimated (such as 504, 604, or 704). Next, a second BER value associated with a first read retry operation performed with respect to the data sector while the read transducer is positioned at a second radial position, the second radial position being different from the first radial position is estimated (such as 512, 612, and/or 712). Both a distance and direction to move the read transducer to a third radial position to perform a second read retry operation with respect to the data sector is then determined based on the first and second BER values, the second radial position being different from the first radial position (such as 514, 614 and 616, or 714 and 722 or 720).

In accordance with another embodiment, a method determines an optimal position for a transducer for a read retry operation in a disc drive (such as 100) using quality measurement (QM) values indicative of errors encountered in attempting to read data from the data sectors. In accordance with this embodiment, a first QM value A is determined for a data sector after a read error has occurred while attempting to read data from the data sector with the read transducer positioned at a first radial position (such as 504, 604, or 704). The read transducer is then moved a predetermined distance from the first radial position in the first direction to a second radial position (such as 506, 606, or 706). A first read retry operation is then performed with respect to the data sector while the read transducer is positioned at the second radial position (such as 508, 608, or 708). A second QM value B for the data sector is determined after a read error has occurred as a result of the first read retry operation (such as 512, 612, or 712). A direction D1 to move the read transducer from the second radial position to a third radial position based on QM values A and B is then determined (such as 514, 614, or 714 and/or 716). A distance X to move the read transducer from the second radial position to the third radial position is then determined based on QM values A and B (such as 514, 616, or 720 or 722). Next, the read transducer is moved to the to the third radial position and a second read retry operation is performed with respect to the data sector while the read transducer is positioned at the third radial position (such as 518, 620, 720 or 730).

In accordance with yet another embodiment, a system for determining an optimal position for a read retry operation in a disc drive (such as 100) disc having at least one track including a plurality of data sectors. Also included in the disc drive is a read transducer (such as 118) for reading data from the data sectors. To access the various data tracks, the read transducer is moveable in either a first or second direction relative to the disc, so that it may be positioned over a track including a data sector from which data is to be read. Also included in the system is a read retry determination means (such as 216 and/or 226) for determining both a distance and direction to move the read transducer to perform a read retry operation with respect to a data sector on the track based on estimated bit error rate (BER) values.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while the various operations shown is FIGS. 5, 6, and 7 are described with respect to a data sector, other units, blocks, or sizes of data, may also be examined for errors. For instance, rather than examining an entire data sector, only a portion of a data sector may be examined for errors. Alternatively, a group of data sectors may be examined for errors. Another change that may be made with respect to the above described embodiments is that that the first move operations (506, 606, 706) that are performed in operational flows 500, 600, 700, respectively, may be adaptive. That is, the distance that the transducer is moved in each of these operations may be variable, based on metrics in the disc drive, such as the magnitude of the errors that were estimated for the preceding read retry operation. As will be appreciated by those skilled in the art, other changes and additions may be made which will readily suggest themselves to those skilled in the art and which are encompassed in the spirit of the invention disclosed and as defined in the appended claims.

What is claimed is:

1. A method for determining an optimal position for a read retry operation in a data storage device, the data storage device including a disc having a plurality of data sectors on the surface thereof, a read transducer for reading data from the data sectors, the read transducer being moveable in either a first or second direction, comprising steps of:
   (a) estimating a first bit error rate (BER) value associated with a read operation performed with respect to a data sector while the read transducer is positioned at a first radial position;
   (b) estimating a second BER value associated with a first read retry operation performed with respect to the data sector while the read transducer is positioned at a second radial position, the second radial position being different from the first radial position;
   (c) determining both a distance and direction to move the read transducer to a third radial position to perform a second read retry operation with respect to the data sector based on the first and second BER values, the second radial position being different from the first radial position.

2. A method as defined in claim 1, wherein the estimating step (a) further comprises steps of:
   (a)(1) moving the transducer a predetermined distance from the first radial position in the first radial direction to the second radial position; and
   (a)(2) performing the first read retry operation.

3. A method as defined in claim 2, wherein the determining step (c) further comprises steps of:
   (c)(1) determining that the transducer is to be moved in the first direction if the second BER is less than the first BER; and
   (c)(2) determining that the transducer is to be moved in the second direction if the second BER is not less than the first BER.

4. A method as defined in claim 2, wherein the determining step (c) further comprises steps of:
   (c)(1) determining that the transducer is to be moved in the second direction if the difference between the second BER minus the first BER is greater than a predetermined value; and
   (c)(2) determining that the transducer is to be moved in the first direction if the difference between the second BER minus the first BER is not greater than a predetermined value.

5. A method as defined in claim 1, further comprising steps of:
   (d) moving the transducer the distance and direction determined in determining step (c) to the third radial position; and
   (e) performing a second read retry operation with respect to the data sector while the head is positioned at the third radial position.

6. A method as defined in claim 5, further comprising steps of:
   (f) estimating a third BER value, the third BER value being associated with the second read retry operation; and
   (g) determining a direction to move the read transducer to perform another read retry operation with respect to the data sector based on the first, second, and third BER values.

7. A method as defined in claim 6, wherein the determining step (g) further comprises steps of:
   (g)(1) determining that the transducer is to be moved in the second direction if the second BER is greater than the first BER and the third BER is greater than the second BER; and
   (g)(2) determining that the transducer is to be moved in the first direction if the second BER is not greater than the first BER and the third BER is not greater than the second BER.

8. A method as defined in claim 5, wherein performing step (e) further comprises steps of:
   (e)(1) determining if a read error has occurred with respect to the second read retry operation; and (e)(2) moving the transducer a predetermined distance D1 in the direction determined in determining step (c) to a fourth radial position and performing a third read retry operation with respect to the data sector while the head is positioned at the fourth radial position if a read error has occurred with respect to the second read retry operation.

9. A method as defined in claim 8, wherein performing step (e) further comprises steps of:
(e)(4) determining a fifth radial position a predetermined distance from the fourth radial position in the direction determined in determining step (c);
(e)(5) determining a distance DT between the first radial position and the fifth radial position; and
(e)(6) moving the transducer to the fifth radial position and performing a fourth read retry operation only if DT is not greater than a predetermined value.

10. A method as defined in claim 5, further comprising steps of:
(f) moving the transducer a predetermined distance in the direction determined in determining step (c) and performing another read retry operation; and
(g) repeating moving step (f) until either a read retry operation is performed that does not result in a read error or until the transducer has been moved to a radial position that is greater that a predetermined distance from the first radial position.

11. A method as defined in claim 1, wherein the first and second BER values are determined using a channel quality monitor.

12. A method for determining an optimal position for a read retry operation in a disc drive, the disc drive including a disc having at least one track having a plurality of data sectors, a read transducer for reading data from the data sectors, the read transducer being moveable in either a first direction or a second direction, and a channel quality monitor operable to produce a quality measurement (QM) value indicative of errors encountered in attempting to read data from the data sectors, comprising;
(a) determining a first QM value A for a data sector after a read error has occurred while attempting to read data from the data sector with the read transducer positioned at a first radial position;
(b) moving the read transducer a predetermined distance from the first radial position in the first direction to a second radial position;
(c) performing a first read retry operation with respect to the data sector while the read transducer is positioned at the second radial position;
(d) determining a second QM value B for the data sector after a read error has occurred as a result of the first read retry operation;
(e) determining a direction D1 to move the read transducer from the second radial position to a third radial position based on QM values A and B;
(f) determining a distance X to move the read transducer from the second radial position to the third radial position based on QM values A and B;
(g) moving the read transducer to the third radial position; and
(h) performing a second read retry operation with respect to the data sector while the read transducer is positioned at the third radial position.

13. A method as defined in claim 12, wherein the distance determined in determining step (e) is based on the difference between the magnitudes of QM values A and B.

14. A method as defined in claim 12, wherein the distance determined in determining step (e) is based on the difference between the magnitudes of A and B and on whether the magnitudes of QM values A and B are each greater than a second predetermined value.

15. A method as defined in claim 12, wherein the distance determined in determining step (e) is based on whether an absolute value of the difference between the magnitudes of QM values A and B is each greater than a first predetermined value.

16. A method as defined in claim 12, wherein the distance determined in determining step (e) is based on whether an absolute value of the difference between the magnitudes of QM values A and B is greater than a predetermined value and on a comparison of the magnitudes of QM values A and B.

17. A method as defined in claim 12, wherein the distance determined in determining step (e) is based on whether the magnitudes of QM values A and B are each greater than a predetermined value.

18. A method as defined in claim 12, wherein the distance determined in determining step (e) is based on whether an absolute value of the difference between the magnitudes of QM values A and B is greater than a first predetermined value and whether the magnitudes of QM values A and B are each greater than a second predetermined value.

19. A method as defined in claim 17, wherein the distance determined in determining step (e) is a first distance if the magnitudes of QM values A and B are each greater than the predetermined value and is a second distance that is smaller than the first distance if the magnitudes of both A and B are not greater than the predetermined value.

20. A method as defined in claim 12, further comprising steps of:
(i) moving the transducer a predetermined distance in the direction D1 and performing another read retry operation; and
(j) repeating moving step (i) until either a read retry operation is performed that does not result in a read error or until the transducer has been moved to a radial position that is greater that a predetermined distance from the first radial position.

21. A system for determining an optimal position for a read retry operation in a disc drive, comprising:
a disc drive including a disc having at least one track having a plurality of data sectors, a read transducer for reading data from the data sectors, the read transducer being moveable in either a first or second direction relative to the disc;
a read retry determination means for determining both a distance and direction to move the read transducer to perform a read retry operation with respect to a data sector on the track based on estimated bit error rate (BER) values.

22. A system as defined in claim 21, wherein the read retry determination means includes a channel quality monitor operable to produce the estimated bit error rate (BER) values.

23. A system as defined in claim 22, wherein the estimated bit error rate values produced by the channel quality monitor comprise quality measurement (QM) values.

24. A system as defined in claim 23, wherein the read retry determination means compares magnitudes of at least two QM values associated with the data sector to determine a distance to move the read transducer to perform the read retry operation.

25. A system as defined in claim 23, wherein the read retry determination means compares magnitudes of at least two QM values associated with the data sector to a predetermined value to determine a distance to move the read transducer to perform the read retry operation.

26. A system, comprising:
   a storage device including a data storage medium having at least one track having one or more data sectors; and
   a read retry determination means for determining a direction to move a read transducer to perform a read retry operation with respect to a data sector on the data storage medium based on estimated bit error rate (BER) values.

27. A system as defined in claim 26, wherein the read retry determination means includes a channel quality monitor operable to produce the estimated bit error rate (BER) values.

28. A system as defined in claim 27, wherein the estimated bit error rate values produced by the channel quality mointor comprise quality measurement (QM) values.

29. A system as defined in claim 28, wherein the read retry determination means compares magnitudes of at least two QM values associated with the data sector to determine a distance to move the read transducer to perform the read retry operation.

30. A system as defined in claim 28, wherein the read retry determination means compares magnitudes of at least two QM values associated with the data sector to a predetermined value to determine a distance to move the read transducer to perform the read retry operation.

31. A system as defined in claim 26, wherein the read transducer moves a predetermined distance in the direction determined by the read retry determination means.

* * * * *

UNITED STATES PATENT AND TRADEMARK OFFICE
CERTIFICATE OF CORRECTION

PATENT NO. : 7,215,494 B2 Page 1 of 1
APPLICATION NO. : 10/263322
DATED : May 8, 2007
INVENTOR(S) : Jun Wang et al.

It is certified that error appears in the above-identified patent and that said Letters Patent is hereby corrected as shown below:

Title page item (75); under INVENTORS delete "Kan Liang Gan" and replace with --Kah Liang Gan--

Signed and Sealed this

Eleventh Day of November, 2008

JON W. DUDAS
*Director of the United States Patent and Trademark Office*